United States Patent [19]

Betterton et al.

[11] Patent Number: 4,846,760
[45] Date of Patent: * Jul. 11, 1989

[54] SHAFT COUPLER

[75] Inventors: Joseph T. Betterton, Arab; Alfred H. Glover, Decatur; Bruce Hepler, Huntsville, all of Ala.

[73] Assignee: Chrysler Motors Corporation, Highland Park, Mich.

[*] Notice: The portion of the term of this patent subsequent to Jul. 11, 2006 has been disclaimed.

[21] Appl. No.: 172,835

[22] Filed: Mar. 25, 1988

[51] Int. Cl.⁴ .................................. F16D 3/50
[52] U.S. Cl. ........................ 464/87; 403/294; 403/300; 464/182; 464/901
[58] Field of Search .............. 24/573; 403/220, 223, 403/294, 300, 305, 309, 313; 411/511, 512; 464/51, 87, 101, 182, 185, 901, 92

[56] References Cited

U.S. PATENT DOCUMENTS

| 218,723 | 8/1979 | Faust . | |
|---|---|---|---|
| 2,404,017 | 7/1946 | Wilkinson . | |
| 2,580,000 | 12/1951 | Batcher . | |
| 2,724,251 | 1/1953 | Weaver | 464/101 |
| 2,903,867 | 2/1956 | Moody | 464/101 |
| 3,340,704 | 9/1967 | Seckerson | 464/101 |
| 3,873,863 | 3/1975 | Pew | 464/87 X |

FOREIGN PATENT DOCUMENTS

| 0101129 | 4/1962 | Netherlands | 464/182 |
|---|---|---|---|
| 1032307 | 6/1966 | United Kingdom | 411/512 |

Primary Examiner—Daniel P. Stodola
Attorney, Agent, or Firm—Kenneth H. MacLean, Jr.

[57] ABSTRACT

A coupler to connect spaced apart ends of a pair of aligned shafts in an odometer assembly, for example, the shaft supporting a permanent or total mileage counting device and another shaft supporting a trip counting device. The coupler has a central body with a thin guide portion extending therefrom for insertion between the shaft ends. Each end of the coupler has a pair of spaced legs defining an open ended slot adapted to receive a shaft end. One leg on either end has a resilient catch-tab for holding the coupler in position on the shaft.

3 Claims, 1 Drawing Sheet

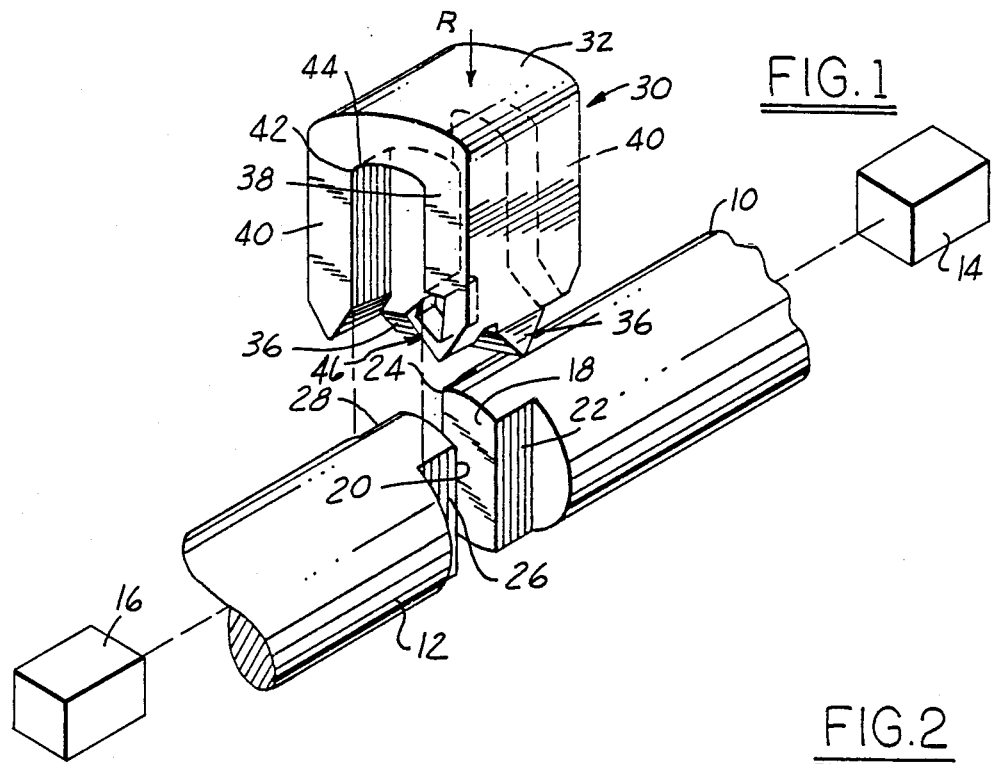
FIG.1
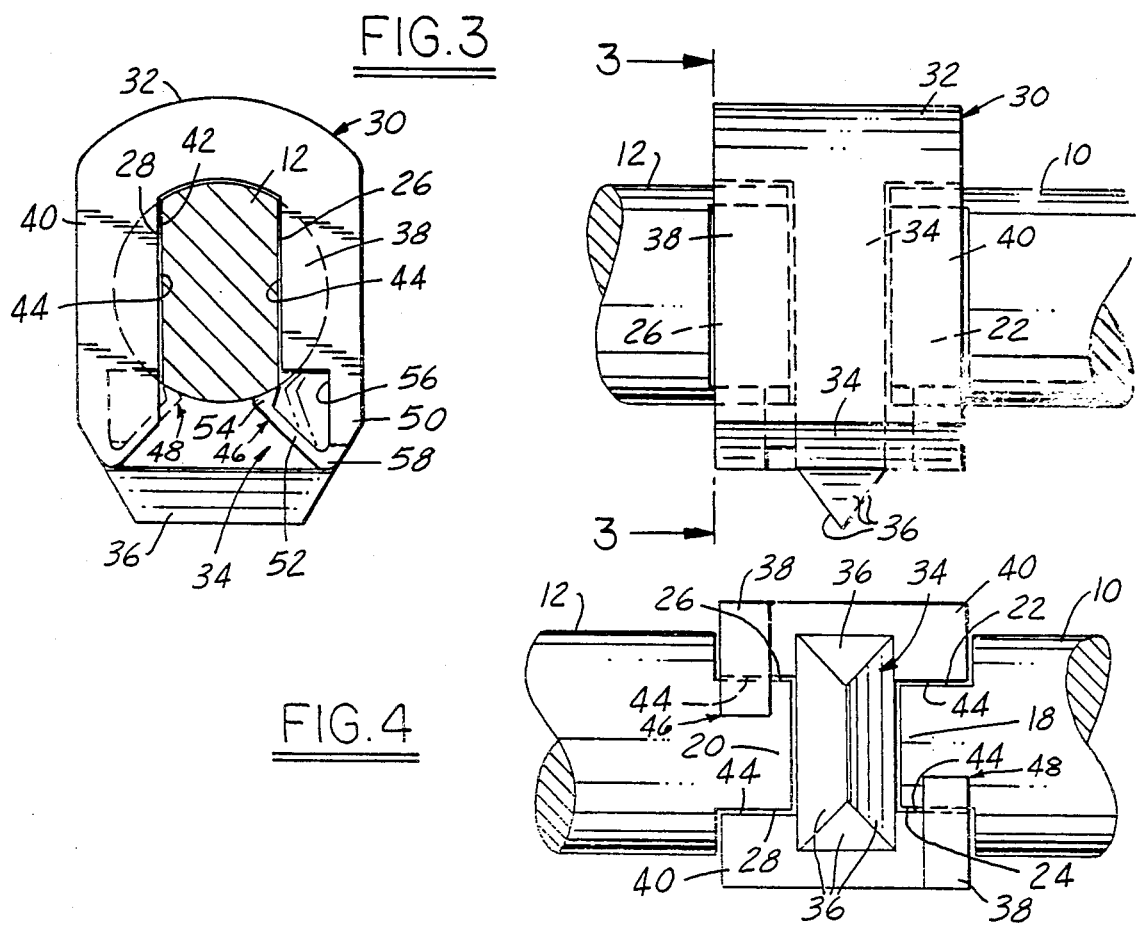
FIG.2
FIG.3
FIG.4

SHAFT COUPLER

BACKGROUND OF THE INVENTION

1. Field of the Invention

This application relates to an improved coupler device for connecting the ends of two aligned shafts such as found in an odometer assembly. Specifically, an aligned primary odometer shaft and trip odometer shaft are commonly used in a mileage counting and recording assembly of an automobile. The coupler device is adapted to be readily inserted in a radial direction of the shaft over adjacent shaft ends. A catch-tab portion acts to inhibit removal in the opposite direction.

2. Description of Related Art

In an automobile odometer assembly or in any other device having two separate but aligned shafts, it is desirable to connect or couple the shafts for rotation together by a device which can be readily applied to the adjacent shaft ends. The subject device is an improvement over a number of such devices. Specifically, the U.S. Pat. No. 2,724,251 to Weaver discloses a coupler for two shafts which has a slot in one wall to receive a first shaft end and ears defining a gpa normal to the first slot. The coupler is inserted over the end of one shaft while the ears are simultaneously moved inward toward the other wall so that the coupler may clear the second shaft.

The U.S. Pat. No. 2,903,867 to Moody also discloses a coupler for connecting two shafts. Like the Weaver patent, the device must be simultaneously inserted over the shaft ends and also squeezed so that the side walls can move between the spaced ends of the two shafts. However, both walls must be moved from their relaxed positions to install the coupler.

The following U.S. patents disclose couplers of general interest but that do not display features as does the subject device which permits the coupler to be readily inserted between the adjacent ends of aligned shafts.

U.S. Pat. No. 218,723
U.S. Pat. No. 481,780
U.S. Pat. No. 2,404,017
U.S. Pat. No. 2,580,000
U.S. Pat. No. 3,662,568

SUMMARY OF THE INVENTION

This application concerns an improved coupling device for connecting adjacent end portions of two axially aligned shafts such as found in some automobile odometers with side-by-side primary and trip odometer rolls. The improved coupler is particularly designed to permit the device to be inserted in the shaft's radial direction over the end portions of the shafts. Thus, it is unnecessary to axially shift the shafts nor alter the coupler in any significant manner. Nor is it necessary to simultaneously insert the coupler and squeeze it or the like so that portions clear the shaft ends.

The subject coupler is a unitary structure of molded plastic or the like. The structure has a base portion or body with a central guide portion adapted to slide between the aligned and axially spaced shaft ends. At both ends of the coupler on either side of the central guide portion are spaced legs or side walls connected by an end wall and forming a drive pocket. The legs and associated end wall define an open ended slot. The slots at either end of the coupler are parallel to one another. The shaft ends are configured with parallel flats and aligned so that during installation of the coupler a surface of one shaft is coplanar with a surface of the other shaft. Likewise, the other surface of one shaft is also coplanar with the other surface of the other shaft. This construction and shaft orientation permits the coupler to be inserted over the shaft ends in a radial direction thereof. At the same time, the slots receive and extend about the flats of the shaft ends.

One leg of the coupler at either end has a flexible catch-tab which is integrally connected to the leg and terminates near a flat of the shaft to attach the coupler to the shaft and thus resist radial disconnecting movements to inhibit removal of the coupler. However, while the coupler is being installed over the shaft ends, the catch-tab moves away from the shaft so that the coupler may freely slide over the shaft flats.

Therefore, an object of this invention is to provide an improved unitary coupler for connecting the ends of two shafts including spaced legs at either end defining parallel slots to slide over flats on the shaft ends for easy insertive assembly of the coupling to the shafts by application of a radially directed force.

Another object of the invention is to provide such a coupler with a catch-tab portion at either end to secure the coupler in the installed position but movable by engagement with a shaft end to a retracted position for assembly but which resists opposite disassembly movements.

Still further objects and advantages of the subject coupler will be more readily apparent after a reading of the following detailed description of a preferred embodiment, reference being had to the drawings which illustrate the embodiment.

IN THE DRAWING

FIG. 1 is a perspective view of the coupler in relation to the aligned shaft ends prior to assembly; and FIG. 2 is a side view of the coupler after the insertive assembly over the shaft ends; and FIG. 3 is a sectional end view of the coupler after assembly to the shaft ends taken along section lines 3—3 in FIG. 2 and looking in the direction of the arrows; and FIG. 4 is a bottom planar view of the assembled coupler and shafts.

DETAILED DESCRIPTION OF A PREFERRED EMBODIMENT

In FIG. 1, two shafts 10 and 12 of an automobile odometer assembly are illustrated. The odometer assembly includes both a total or permanent mileage recorder 14 and a trip mileage recorder 16 which are only shown schematically. Each of the recorders 14 and 16 is of the type utilizing a plurality of wheels rotatively supported on a common shaft. Thus shaft 10 supports the permanent recorder 14 and shaft 12 supports the trip recorder 16. The shafts are axially aligned and mounted on an odometer frame (not shown in the drawings). A drive mechanism (not shown) is operably attached to the shaft 10 to cause the shaft to rotate according to automobile movement. The rotation of shaft 10 produces rotation of the permanent odometer in a manner well known in the odometer art. Likewise, the means of operably driving the shaft 10 is well known.

It is desirable to produce rotation of the other shaft 12 in correspondence to the rotation of the shaft 10. Rotation of the shaft 12 will move the trip odometer recorder 16 in the same manner that the permanent odometer recorder 14 is moved by shaft 10. Accordingly, the end portions 18 and 20 of shafts 10, 12 are formed with flats 22, 24, 26 and 28. The flats 22 and 24 formed on the end of shaft 10 form parallel surfaces as do the flats 26 and 28 on the end of shaft 12. The shafts 10 and 12 are oriented for assembly with pairs of flats 22, 26 and 24 and 28 aligned and coplanar as illustrated. This permits the subject unitary coupler 30 to be assembled to the shaft ends 18 and 20 by a single and simple insertive movement in the radial direction R in FIG. 1 as will be even clearer by the following explanation.

The unitary coupler 30 has central base or body with an upper end portion 32 as seen in FIG. 1. The end portion 32 has a central guide portion 34 extending downward therefrom. The axially extending thickness dimension of the guide portion 34 is slightly less than the design determined distance between the shaft ends as best seen in FIG. 4. Also, the lower end of the guide portion 34 is configured to form a point with inclined surfaces 36 so that the guide portion may be easily slid between the spaced end portions 18 and 20 of the shaft.

Each end of the unitary coupler 30 has spaced legs 38 and 40 with inner surfaces 44 which define an elongated drive slot 42 between the legs. As best seen in FIG. 1, the upper end portions of the legs 38 and 40 are integrally connected by portion 32 to close the upper end of the slot 42. As best shown in FIGS. 1 and 3, the lower portions of the legs are spaced to form a shaft receiving opening to the slot 42. In the assembled position of the coupler, the inner surfaces 44 of legs 38 and 40 extend along the surfaces 22–28 forming the flats on the shaft ends.

The coupler also includes two catch-tabs 46 and 48 which are integral with the lower ends of legs 38, one at either end of the coupler. As best seen in FIGS. 1 and 3, the catch tabs 46 and 48 are formed by thin walled side portions 50 bottom walled portions 52 and an end portion 54. The thin configuration of the walls 50, 52 is created by a hollow 56 which is formed in the molding of the coupler. The portions 50 and 52 are connected by a thin integral hinge 58. The hinge 58 permits the end 54 to move outward to the dashed line position in FIG. 3 so that the coupler 30 can slide about either surface of the shaft flats. After the flat configured portion of the shaft is fully within the slot 42, the end 54 returns to its natural position shown in solid lines and opposite disassembling movement of the coupler is inhibited.

A significant advantage of the subject coupler is the easy assembly of it to the shaft ends. The preassembly position of the coupler is shown in FIG. 1. Application of the radially directed force R to the coupler readily applies the coupler to the shaft ends and into the position shown in FIGS. 2–4. Preferably, the coupler is molded of a relatively stiff and tough plastic material such as nylon or polyethylene.

From the above description and the drawings, it can be understood that the subject coupler may be easily installed over the end portions of two spaced and aligned shafts without movement of the shafts. The installation requires only a light force on the coupler in a radially inwardly direction with respect to the shaft. Although only one embodiment of the coupler is shown and described in great detail, it is obvious that modifications to the coupler can be made which still fall within the scope of the following claims which define the invention.

We claim:

1. A unitary coupler for installation between the spaced ends of two axially aligned shafts and is readily insertable therebetween in a radial direction of the shaft, the shaft ends each being configured with parallel flats, a flat of each shaft being substantially planar with a corresponding flat of the other shaft, the coupler comprising: the coupler having a central body with a guide portion projecting therefrom adapted to extend between the ends of the shafts; a pair of spaced leg portions on each end of the coupler defining a slot therebetween to receive a flat configured portion of a shaft end between the legs, the slots at either end being generally parallel to one another; the spacing of the legs being sufficient to permit the flat configured shaft ends to be readily received by the slots as the coupler is inserted on the shafts in the radial direction of the shafts; one leg at either end of the coupler supporting a catch-tab portion including a shaft engaging part which inhibits opposite radial movement of the coupler from the assembled position on the shaft end but is movable to permit insertion of the shaft end into the slot.

2. The coupler of claim 1 in which the catch-tab of the leg is formed by a thin side and end wall integrally connected together in a resilient and flexible manner to permit the end of the catch-tab to engage the shaft during and after the assembly of the coupler to the shaft.

3. The coupler of claim 2 in which the coupler body is of molded elastomeric material which provides sufficient resiliency for flexible movement of the side and end walls of the catch-tab.

* * * * *